(12) United States Patent
Seno (10) Patent No.: US 8,473,424 B2
(45) Date of Patent: Jun. 25, 2013

(54) ELECTRONIC BUSINESS TRANSACTION SYSTEM

(75) Inventor: Hachirou Seno, Fukuoka (JP)

(73) Assignee: Takamitsu Sangyou Co., Ltd., Fukuoka (JP)

( * ) Notice: Subject to any disclaimer, the term of this patent is extended or adjusted under 35 U.S.C. 154(b) by 138 days.

(21) Appl. No.: 13/049,970

(22) Filed: Mar. 17, 2011

(65) Prior Publication Data

US 2011/0258133 A1    Oct. 20, 2011

Related U.S. Application Data

(63) Continuation of application No. PCT/JP2009/066039, filed on Sep. 14, 2009.

(30) Foreign Application Priority Data

Sep. 18, 2008   (JP) .................................. 2008-239215

(51) Int. Cl.
*G06Q 30/00*  (2012.01)

(52) U.S. Cl.
USPC .... 705/330; 705/26.1; 705/26.25; 705/26.35; 705/26.42; 705/26.44

(58) Field of Classification Search
USPC ................................ 705/1.1, 26.1–26.44, 330
See application file for complete search history.

(56) References Cited

U.S. PATENT DOCUMENTS

| | | | |
|---|---|---|---|
| 8,131,651 B1 * | 3/2012 | Bennett et al. ................. | 705/335 |
| 2005/0033659 A1 * | 2/2005 | Zucker et al. .................... | 705/26 |
| 2005/0192913 A1 * | 9/2005 | Lubart ........................... | 705/406 |

FOREIGN PATENT DOCUMENTS

| | | |
|---|---|---|
| JP | 2001-331733 A | 11/2001 |
| JP | 2002-109409 A | 4/2002 |
| JP | 2003-168014 A | 6/2003 |
| JP | 2003-233729 A | 8/2003 |
| JP | 2004-206319 A | 7/2004 |
| JP | 2006-012015 A | 1/2006 |

* cited by examiner

*Primary Examiner* — George Chen
(74) *Attorney, Agent, or Firm* — Kubotera & Associates, LLC (57) ABSTRACT

An electronic business transaction system is provided for a product purchaser to purchase a product from a product supplier, and for a product delivery service provider to deliver the product to an address of the product purchaser or a product receiver. The product purchaser instructs an identification code and the product to the product supplier without disclosing a name and the address of the product purchaser or the product receiver. A terminal of an information administrator identifies the name and the address of the product purchaser or the product receiver according to the identification code of the product purchaser or the product receiver. The terminal of the information administrator instructs the name and the address of the product purchaser or the product receiver to the product delivery service provider without disclosing the identification code of the product purchaser or the product receiver, so that the product delivery service provider delivers the product.

4 Claims, 7 Drawing Sheets

ELECTRONIC BUSINESS TRANSACTION SYSTEM

CROSS-REFERENCE TO RELATED APPLICATIONS

This is a continuation application of the prior PCT application PCT/JP2009/66039, filed on Sep. 14, 2009, pending, which claims priority from a Japanese patent application No. 2008-239215, filed on Sep. 18, 2008, the entire content of which is incorporated herein by reference.

BACKGROUND OF THE INVENTION AND RELATED ART STATEMENT

The present invention relates to an electronic business transaction system. In particular, the present invention relates to an electronic business transaction system, in which a terminal of a product purchaser, a terminal of a product supplier, a terminal of a product delivery service provider, and a terminal of an information administrator, who administrates information regarding the product purchaser, are connected through an electronic communication network, so that the product delivery service provider delivers a product purchased by the product purchaser from the product supplier to the product purchaser or a product receiver.

In recent years, as an electronic communication network such as Internet has being widely available, an electronic business transaction system has been widely used. In the electronic business transaction system, terminals connected to the electronic communication network are used for purchasing a product.

In general, in such an electronic business transaction system, a purchasing order of a product is placed through specifying a product name, and a name and an address of a product purchaser from a terminal of the product purchaser to a terminal of a product supplier. Then, the product supplier transmits the product name, and the name and the address of the product purchaser to a product delivery service provider, so that the product supplier requests the product delivery service provider to deliver the product to the address of the product purchaser. Accordingly, the product delivery service provider delivers the product to the address of the product purchaser.

However, due to a recent increase in crimes associated with the electronic business transaction system, many product purchasers tend to hesitate to use the electronic business transaction system, worrying about a risk of leaking personal information such as an individual name and an address to general public.

Patent Reference 1 has disclosed a conventional electronic business transaction system, in which an address different from an actual address where a product purchaser resides is specified as a delivery destination of a product. In this case, the product delivery service provider delivers the product to the address thus specified, so that the product purchaser can receive the product at the address thus specified.
Patent Reference 1: Japanese Patent Publication No. 2002-109409

In the conventional electronic business transaction system, it is possible to purchase the product without disclosing the actual address of the product purchaser to the product supplier and the product delivery service provider. However, it is necessary for the product purchaser to go to the address different from the actual address where the product purchaser resides, thereby causing troublesome to the product purchaser. Further, for the product supplier and the product delivery service provider, it is not certain that the product purchaser can receive the product at the address different from the actual address. Accordingly, the conventional electronic business transaction system is not practical.

In particular, when the product purchaser purchases the product using the conventional electronic business transaction system, not only the product purchaser purchases and receives the product by him or herself, but the product purchaser may purchase the product so that other person as a product receiver can receive the product. In this case, the product purchaser need to notify a name and an address of the product receiver to the product supplier and the product delivery service provider, thereby causing a risk in terms of individual information protection.

In view of the problems described above, an object of the present invention is to provide an electronic business transaction system capable of solving the problems of the conventional electronic business transaction system.

SUMMARY OF THE INVENTION

In order to attain the objects described above, according to the present invention, an electronic business transaction system is provided for a product purchaser to purchase a product from a product supplier, and for a product delivery service provider to deliver the product to an address of the product purchaser or a product receiver. In the electronic business transaction system, the product purchaser instructs an identification code and the product to the product supplier without disclosing a name and the address of the product purchaser or the product receiver. A terminal of an information administrator identifies the name and the address of the product purchaser or the product receiver according to the identification code of the product purchaser or the product receiver. Then, the terminal of the information administrator instructs the name and the address of the product purchaser or the product receiver to the product delivery service provider without disclosing the identification code of the product purchaser or the product receiver, so that the product delivery service provider delivers the product.

In the present invention, it is possible to receive the product thus purchased at home without disclosing the name and the address of the product purchaser or the product receiver to the product supplier. Accordingly, it is possible for the product purchaser to use the electronic business transaction system without worry, thereby improving convenience of the electronic business transaction system.

DETAILED DESCRIPTION OF PREFERRED EMBODIMENTS

Hereunder, a specific configuration of an electronic business transaction system in embodiments of the present invention will be hereinafter described with reference to the accompanying drawing. In the following description, in a first embodiment and a second embodiment, a product purchaser receives a product by him or herself (a normal purchasing transaction). In a third embodiment and a fourth embodiment, a product receiver other than the product purchaser receives a product (a gift purchasing transaction).

First Embodiment

Figure 1:
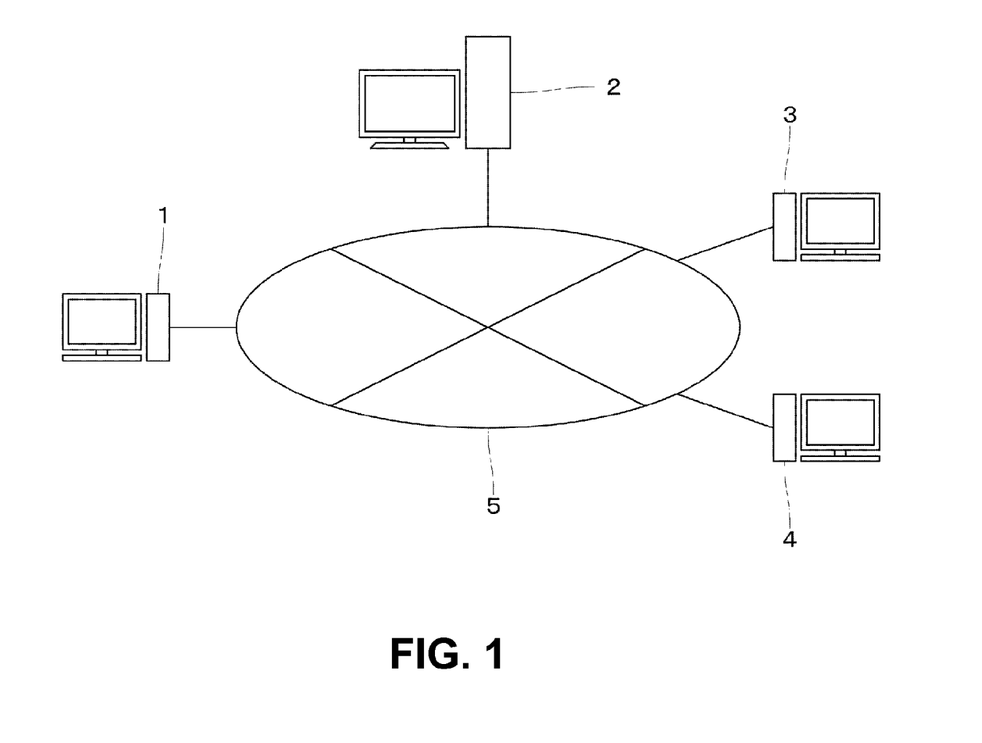
FIG. 1 is a schematic view showing a hardware configuration of an electronic business transaction system according to a first embodiment of the present invention.

In the first embodiment, as shown in FIG. 1, a terminal 1 of the product purchaser, who is going to purchase the product, a terminal 2 of an information administrator, who administrates information regarding the product purchaser, a terminal 3 of a product supplier, who supplies the product, and a terminal 4 of a product delivery service provider, who delivers the product to the product purchaser, are connected through an electronic communication network 5. In the first embodiment, the terminals 1 to 4 may include various electronic devices having a communication function of electronic data such as a computer, a mobile terminal, and a mobile telephone.

Figure 2:
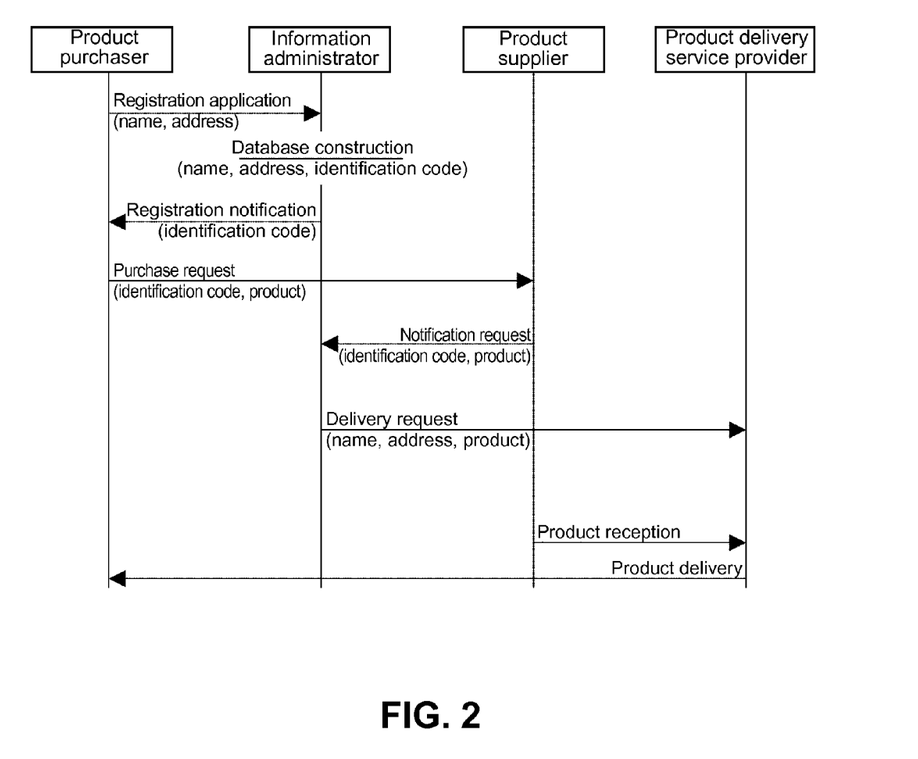
FIG. 2 is a schematic view showing a software configuration of the electronic business transaction system according to the first embodiment of the present invention.

In an electronic business transaction system in the first embodiment, as shown in FIG. 2, first, the product purchaser applies a registration to the information administrator (a registration application step). More specifically, the product purchaser transmits personal information data such as such as a name and an address of the product purchaser from the terminal 1 of the product purchaser to the terminal 2 of the information administrator. The personal information data are not limited to the name and the address of the product purchaser, and may include various types of information such as an age, a mail address, a financial institution account number.

In the next step, the information administrator constructs a database including the personal information data of the product purchaser (a database construction step). More specifically, an identification code specific to the product purchaser is added to the personal information data received with the terminal 2 of the information administrator from the terminal 1 of the product purchaser to generate data 6. Then, the data 6 are stored (accumulated) in a recording medium to construct a database 7 (refer to FIG. 3). In addition to the identification code, a password may be added.

In the next step, the information administrator notifies the product purchaser that the registration is complete (a registration notification step). More specifically, a mail of the registration completion with the identification code of the product purchaser attached thereto is transmitted from the terminal 2 of the information administrator to the terminal 1 of the product purchaser.

Through the steps described above, the product purchaser can purchase the product using the electronic business transaction system.

In the next step, the product purchaser instructs the product to be purchased and the identification code of the product purchaser to the product supplier, so that the product purchaser requests purchase of the product (a purchase request step). More specifically, a mail describing the identification code and the product to be purchased is transmitted from the terminal 1 of the product purchaser to the terminal 3 of the product supplier.

In the purchase request step, the product purchaser simply specifies the identification code of the product purchaser to the product supplier, and does not need to notify the name and the address of the product purchaser to the product supplier.

After the purchase request step, the product purchaser may specify the identification code to the information administrator, so that the product purchaser can receive confirmation of the product purchaser or warranty. Further, the product supplier may confirm the purchase of the product to the product purchaser.

In the next step, the product supplier specifies the identification code of the product purchaser and the product to be purchased to the information administrator, so that the product supplier requests the information administrator to notify the product delivery service provider (a notification request step). More specifically, a mail describing the identification code of the product purchaser and the product to be purchased is transmitted from the terminal 3 of the product supplier to the terminal 2 of the information administrator.

In the next step, the information administrator instructs the name and the address of the product purchaser and the product to be purchased to the product delivery service provider, so that the product delivery service provider delivers the product to the product purchaser (a delivery request step). More specifically, the information administrator identifies the name and the address of the product purchaser using the database 7 according to the identification code of the product purchaser received with the terminal 2 of the information administrator from the terminal 3 of the product supplier. Then, the information administrator transmits a mail describing the name and the address of the product purchaser and the product to be purchased from the terminal 2 of the information administrator to the terminal 4 of the product delivery service provider.

In the delivery request step, the information administrator simply instructs the name and the address of the product purchaser to the product delivery service provider, and does not need to notify the identification code of the product purchaser to the product delivery service provider.

In the next step, the product delivery service provider receives the product from the product supplier (a product receiving step), and the product delivery service provider delivers the product to the address of the product purchaser (a product delivery step).

Second Embodiment

Figure 3:
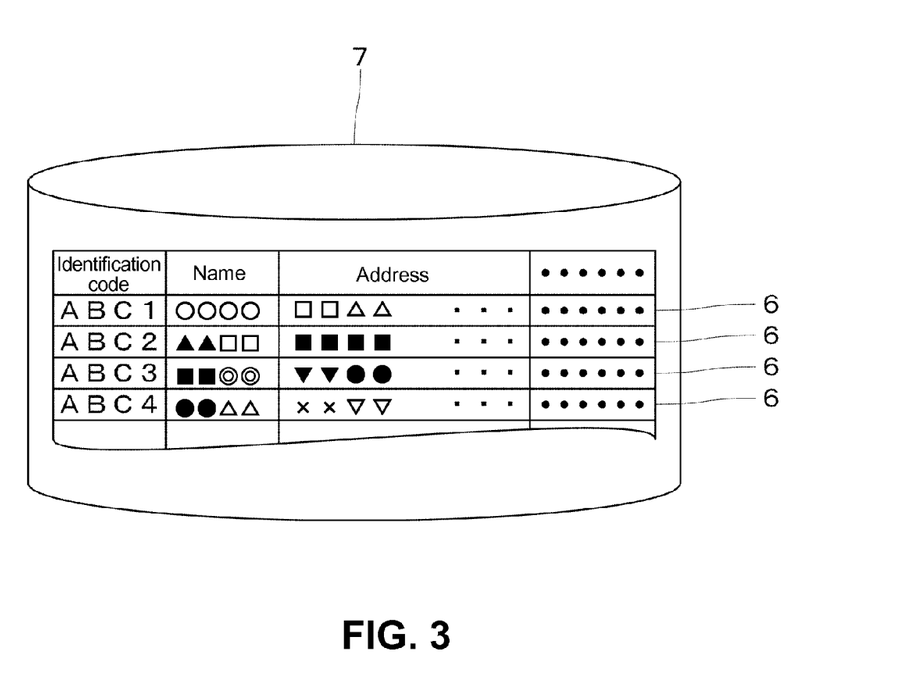
FIG. 3 is a schematic view showing a database of the electronic business transaction system according to the first embodiment of the present invention.
Figure 4:
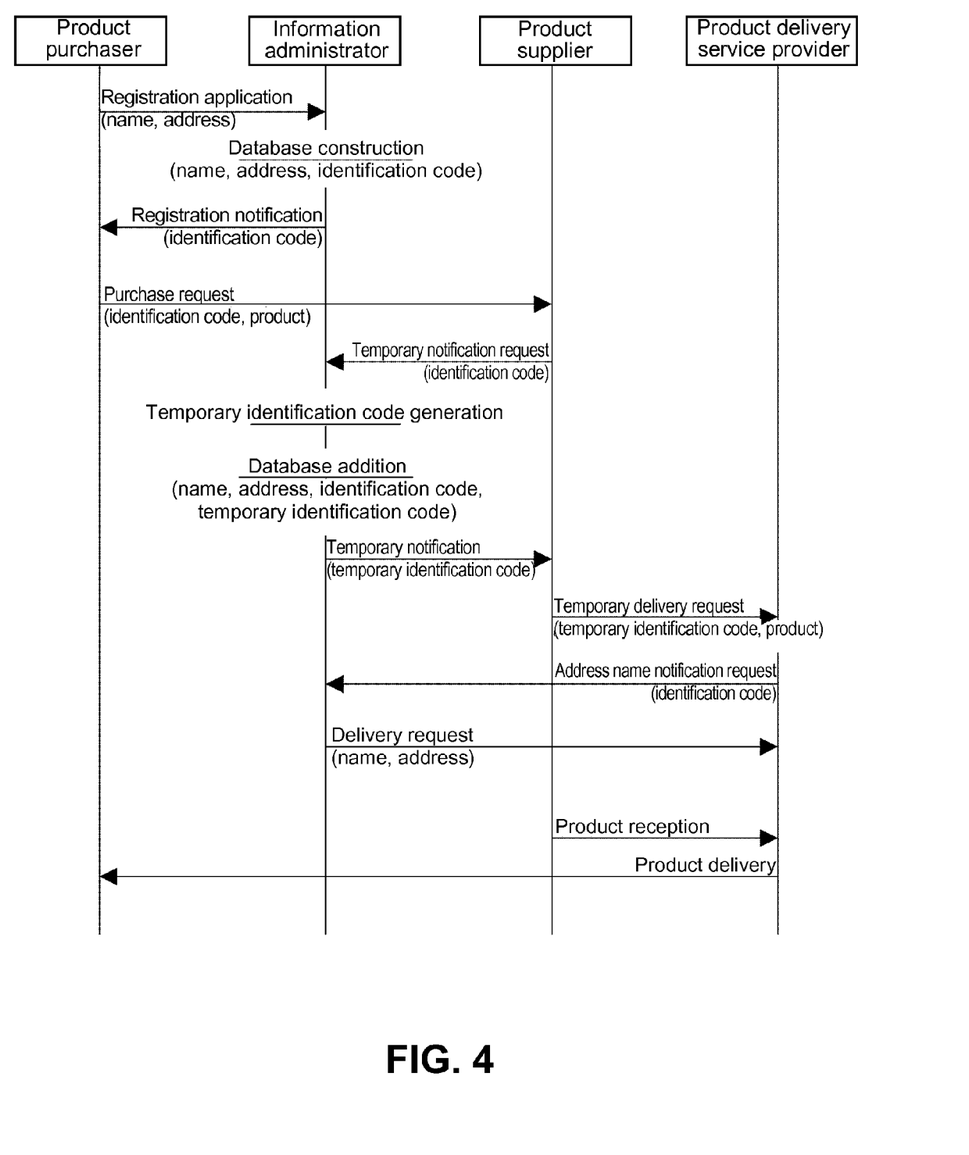
FIG. 4 is a schematic view showing a software configuration of an electronic business transaction system according to a second embodiment of the present invention.

In the second embodiment, as shown in FIGS. 1, 3, and 4, the registration application step, the database construction step, the registration notification step, and the purchase request step are performed similar to the first embodiment.

When the product purchaser requests the purchase of the product, the product supplier specifies the identification code of the product purchaser to the information administrator, so that the product supplier requests the information administrator to notify a temporary identification code of the product purchaser (a temporary notification request step). More specifically, a mail describing the identification code of the product purchaser and the product to be purchased is transmitted from the terminal 3 of the product supplier to the terminal 2 of the information administrator.

In the next step, the information administrator generates the temporary identification code of the product purchaser (a temporary identification code generation step. Then, the information administrator stores the temporary identification code in the database 7 (a database addition step). Then, the information administrator notifies the temporary identification code to the product supplier (a temporary notification step).

More specifically, the information administrator generates the temporary identification code with respect to the identification code of the product purchaser received with the terminal 2 of the information administrator from the terminal 3 of the product supplier. Then, the information administrator adds and accumulates the temporary identification code as the data 6 of the product purchaser in the database 7. Then, the information administrator sends a mail describing the temporary identification code to the terminal 3 of the product supplier.

In the next step, the product supplier notifies the temporary identification code of the product purchaser and the product to be purchased to the product delivery service provider, so that the product supplier requests the product delivery service provider to deliver the product to the product purchaser (a temporary delivery request step). More specifically, the product supplier transmits a mail describing the temporary identification code of the product purchaser and the product to be purchased from the terminal 3 of the product supplier to the terminal 4 of the product delivery service provider.

In the next step, the product delivery service provider specifies the temporary identification code of the product purchaser to the information administrator, so that the product delivery service provider requests the information administrator to notify the name and the address of the product purchaser (a name address notification request step). More specifically, the terminal 4 of the product delivery service provider transmits the mail describing the temporary identification code of the product purchaser received from the terminal 3 of the product supplier to the terminal 2 of the information administrator.

In the next step, the information administrator identifies the identification code of the product purchaser from the database 7 according to the temporary identification code of the product purchaser, and instructs the name and the address of the product purchaser and the product to be purchased to the product delivery service provider, so that the product delivery service provider delivers the product to the product purchaser (a delivery request step).

More specifically, the information administrator identifies the identification code of the product purchaser using the database 7 according to the temporary identification code of the product purchaser received with the terminal 2 of the information administrator from the terminal 4 of the product delivery service provider. Further, the information administrator identifies the name and the address of the product purchaser. Then, the information administrator transmits a mail describing the name and the address of the product purchaser and the product to be purchased from the terminal 2 of the information administrator to the terminal 4 of the product delivery service provider.

In the delivery request step, the information administrator simply instructs the name and the address of the product purchaser to the product delivery service provider, and does not need to notify the identification code of the product purchaser to the product delivery service provider.

In the next step, the product delivery service provider receives the product from the product supplier (the product receiving step), and the product delivery service provider delivers the product to the address of the product purchaser (the product delivery step).

As explained above, in the electronic business transaction system in the first and second embodiments, the product purchaser can purchase the product without disclosing the name and the address to the product supplier. Accordingly, it is possible for the product purchaser to reduce a risk of leaking the personal information, and to use the electronic business transaction system without worry.

Further, the product supplier securely delivers the product to the product purchaser from the product delivery service provider through the information administrator without knowing the name and the address of the product purchaser. Accordingly, it is possible for the product supplier to use the electronic business transaction system without worry as well.

Further, the product supplier confirms only the identification code of the product purchaser, and the product delivery service provider confirms only the name and the address of the product purchaser. Only the information administrator holds the relationship between the identification code of the product purchaser and the name and the address. Accordingly, it is possible reduce a risk of inadvertently leaking the relationship between the identification code of the product purchaser and the name and the address from the product supplier or the product delivery service provider.

For the reasons described above, in the electronic business transaction system in the first and second embodiments, it is possible for the product purchaser, the product supplier, and the product delivery service provider to use the electronic business transaction system without worry. Accordingly, it is possible to improve convenience of the electronic business transaction system.

Third Embodiment

Figure 5:
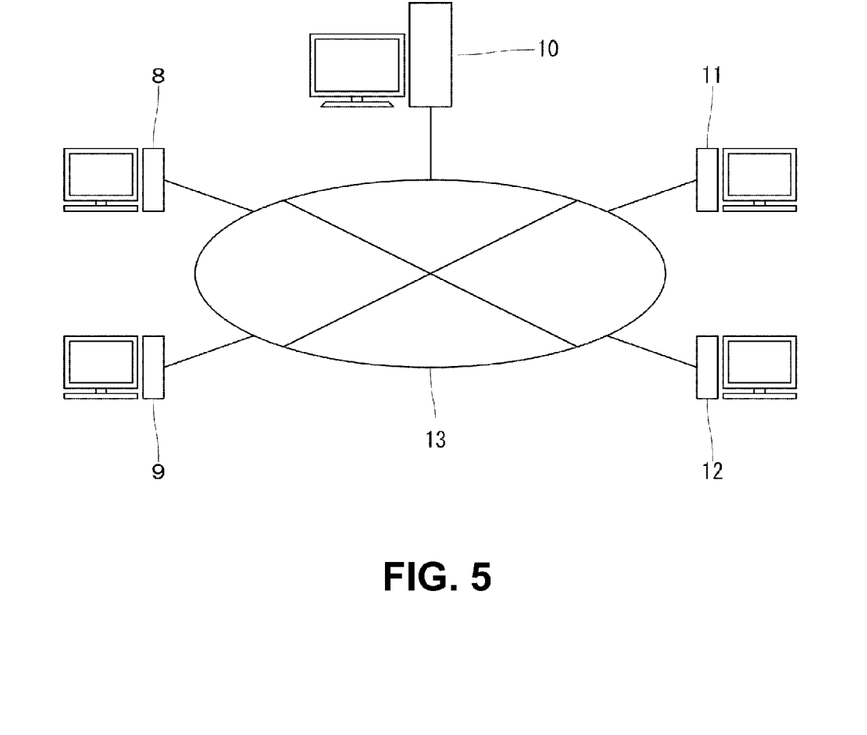
FIG. 5 is a schematic view showing a hardware configuration of an electronic business transaction system according to a third embodiment of the present invention.

In the third embodiment, as shown in FIG. 5, a terminal 8 of the product purchaser, who is going to purchase the product, a terminal 9 of a product receiver, who is going to receive the product, a terminal 10 of the information administrator, who administrates information regarding the product purchaser and the product receiver, a terminal 11 of the product supplier, who supplies the product, and a terminal 12 of the product delivery service provider, who delivers the product to the product purchaser, are connected through an electronic communication network 13. In the third embodiment, the terminals 8 to 12 may include various electronic devices having a communication function of electronic data such as a computer, a mobile terminal, and a mobile telephone.

Figure 6:
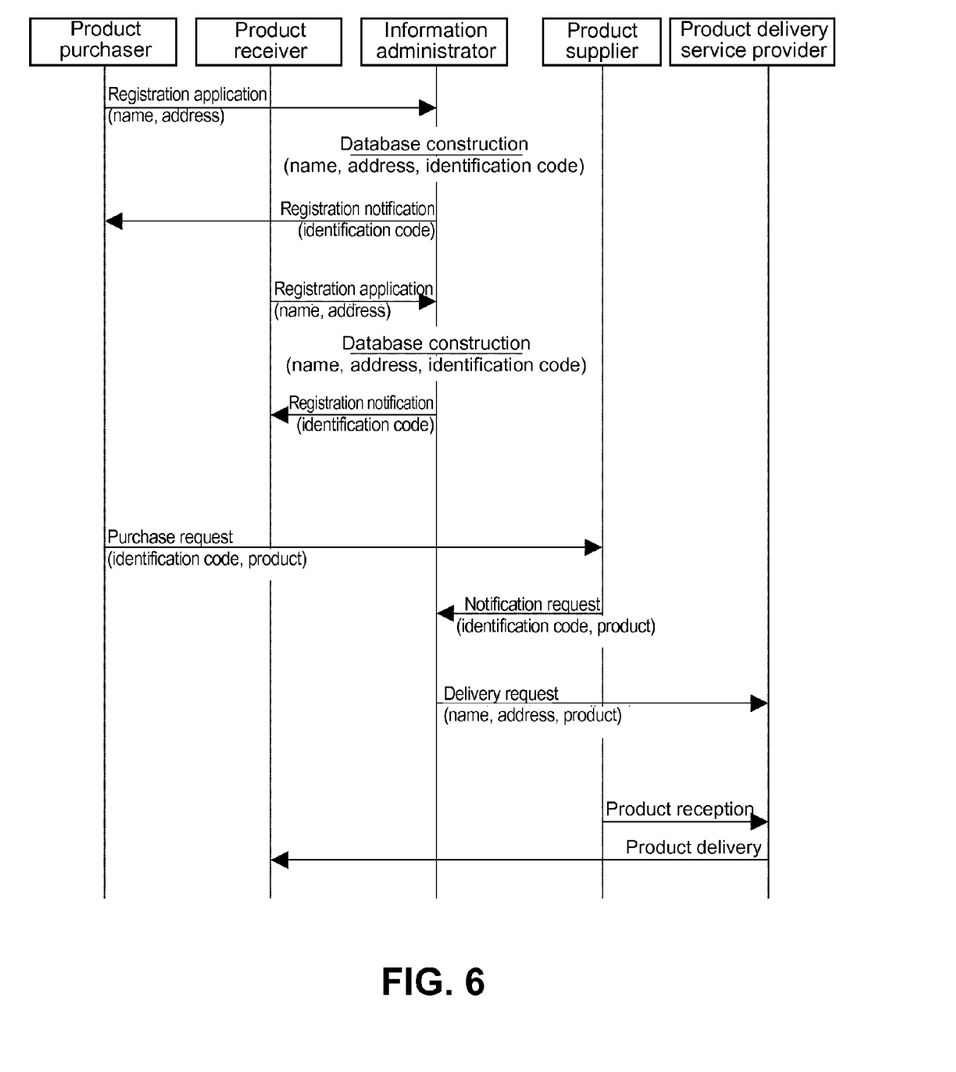
FIG. 6 is a schematic view showing a software configuration of the electronic business transaction system according to the third embodiment of the present invention.

In an electronic business transaction system in the third embodiment, as shown in FIG. 6, first, the product purchaser applies the registration to the information administrator (the registration application step). More specifically, the product purchaser transmits personal information data such as such as a name and an address of the product purchaser from the terminal 8 of the product purchaser to the terminal 10 of the information administrator. The personal information data are not limited to the name and the address of the product purchaser, and may include various types of information such as an age, a mail address, a financial institution account number.

In the next step, the information administrator constructs the database including the personal information data of the product purchaser (the database construction step). More specifically, the identification code specific to the product purchaser is added to the personal information data received with the terminal 10 of the information administrator from the terminal 8 of the product purchaser to generate the data 6. Then, the data 6 are stored (accumulated) in the recording medium to construct the database 7 (refer to FIG. 3). In addition to the identification code, a password may be added.

In the next step, the information administrator notifies the product purchaser that the registration is complete (the registration notification step). More specifically, the mail of the registration completion with the identification code of the product purchaser attached thereto is transmitted from the terminal 10 of the information administrator to the terminal 8 of the product purchaser.

In the electronic business transaction system, the product receiver also applies the registration to the information administrator (the registration application step). More specifically, the product receiver transmits personal information data such as such as a name and an address of the product receiver from the terminal 9 of the product receiver to the terminal 10 of the information administrator. The personal information data are not limited to the name and the address of the product receiver, and may include various types of information such as an age, a mail address, a financial institution account number.

In the next step, the information administrator constructs the database including the personal information data of the product receiver (the database construction step). More specifically, the identification code specific to the product receiver is added to the personal information data received with the terminal 10 of the information administrator from the terminal 9 of the product receiver to generate the data 6. Then, the data 6 are stored (accumulated) in the recording medium to construct the database 7 (refer to FIG. 3). In addition to the identification code, a password may be added.

In the next step, the information administrator notifies the product receiver that the registration is complete (the registration notification step). More specifically, the mail of the registration completion with the identification code of the product receiver attached thereto is transmitted from the terminal 10 of the information administrator to the terminal 9 of the product receiver.

Through the steps described above, the product purchaser can purchase the product, and the product receiver can receive the product using the electronic business transaction system.

In the next step, the product purchaser instructs the product to be purchased and the identification code of the product receiver to the product supplier, so that the product purchaser requests purchase of the product (the purchase request step). More specifically, a mail describing the identification code of the product purchaser, the identification code of the product receiver, and the product to be purchased is transmitted from the terminal 8 of the product purchaser to the terminal 11 of the product supplier.

In the purchase request step, the product purchaser simply specifies the identification code of the product purchaser and the identification code of the product receiver to the product supplier, and does not need to notify the name and the address of the product purchaser to the product supplier.

After the purchase request step, the product purchaser may specify the identification code of the product purchaser and the identification code of the product receiver to the information administrator, so that the product purchaser and the product receiver can receive confirmation of the product purchaser or warranty. Further, the product supplier may confirm the purchase or the reception of the product to the product purchaser and the product receiver.

In the next step, the product supplier specifies the identification code of the product receiver and the product to be purchased to the information administrator, so that the product supplier requests the information administrator to notify the product delivery service provider (the notification request step). More specifically, a mail describing the identification code of the product receiver and the product to be purchased is transmitted from the terminal 11 of the product supplier to the terminal 10 of the information administrator.

In the next step, the information administrator instructs the name and the address of the product receiver and the product to be purchased to the product delivery service provider, so that the information administrator requests the product delivery service provider to deliver the product to the product receiver (the delivery request step). More specifically, the information administrator identifies the name and the address of the product receiver using the database 7 according to the identification code of the product receiver received with the terminal 10 of the information administrator from the terminal 11 of the product supplier. Then, the information administrator transmits a mail describing the name and the address of the product receiver and the product to be purchased from the terminal 10 of the information administrator to the terminal 12 of the product delivery service provider.

In the delivery request step, the information administrator simply instructs the name and the address of the product receiver to the product delivery service provider, and does not need to notify the identification code of the product receiver to the product delivery service provider.

In the next step, the product delivery service provider receives the product from the product supplier (the product receiving step), and the product delivery service provider delivers the product to the address of the product receiver (the product delivery step).

Fourth Embodiment

Figure 7:
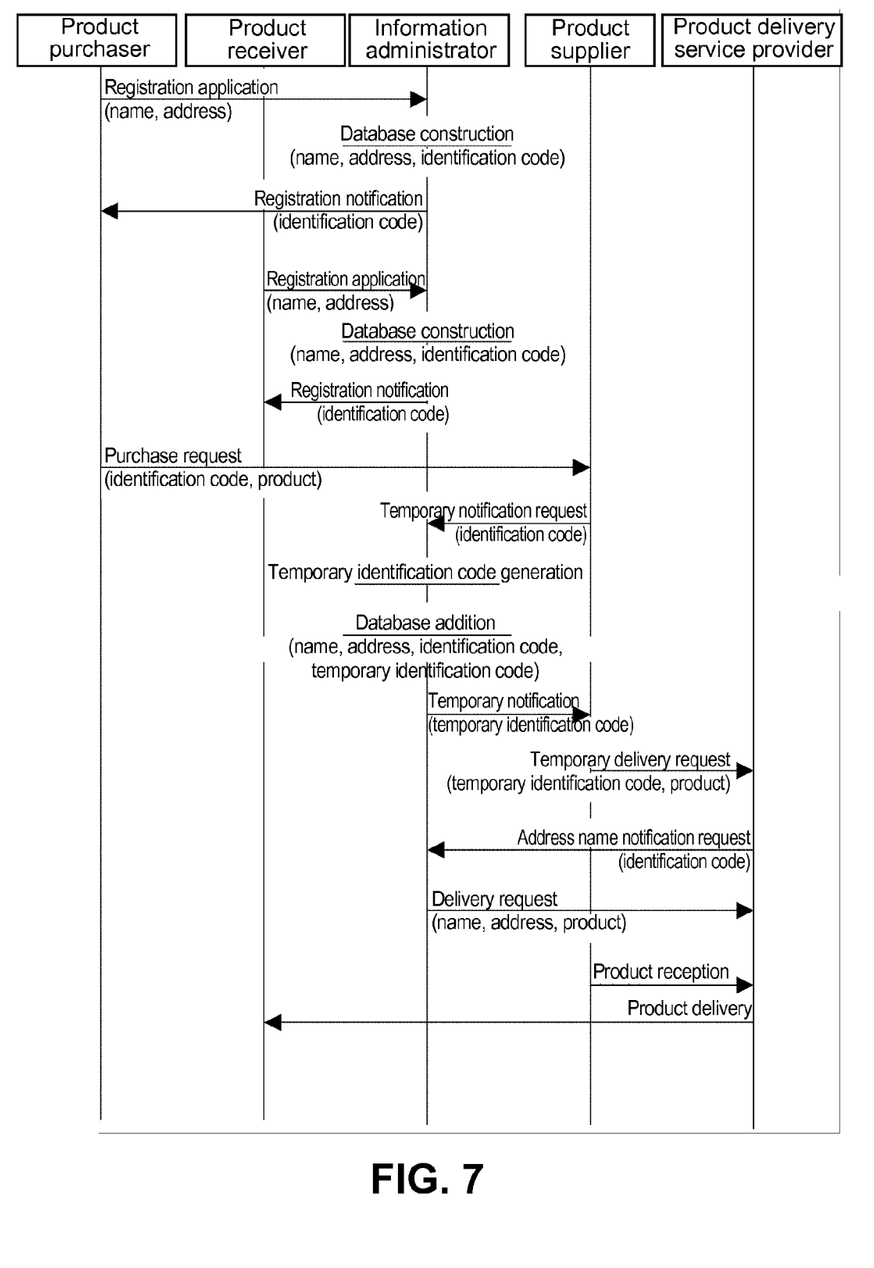
FIG. 7 is a schematic view showing a software configuration of an electronic business transaction system according to a fourth embodiment of the present invention.

In the fourth embodiment, as shown in FIGS. 5 and 7, the registration application step, the database construction step, the registration notification step, and the purchase request step are performed similar to the third embodiment.

When the product purchaser requests the purchase of the product, the product supplier specifies the identification code of the product receiver to the information administrator, so that the product supplier requests the information administrator to notify a temporary identification code of the product receiver (the temporary notification request step). More specifically, a mail describing the identification code of the product receiver and the product to be purchased is transmitted from the terminal 3 of the product supplier to the terminal 2 of the information administrator.

In the next step, the information administrator generates the temporary identification code of the product receiver (the temporary identification code generation step. Then, the information administrator stores the temporary identification code in the database 7 (the database addition step). Then, the information administrator notifies the temporary identification code to the product supplier (the temporary notification step).

More specifically, the information administrator generates the temporary identification code with respect to the identification code of the product receiver received with the terminal 2 of the information administrator from the terminal 3 of the product supplier. Then, the information administrator adds and accumulates the temporary identification code as the data 6 of the product receiver in the database 7. Then, the information administrator sends a mail describing the temporary identification code to the terminal 3 of the product supplier.

In the next step, the product supplier notifies the temporary identification code of the product receiver and the product to be purchased to the product delivery service provider, so that the product supplier requests the product delivery service provider to deliver the product to the product receiver (the temporary delivery request step). More specifically, the product supplier transmits a mail describing the temporary identification code of the product receiver and the product to be purchased from the terminal 3 of the product supplier to the terminal 4 of the product delivery service provider.

In the next step, the product delivery service provider specifies the temporary identification code of the product receiver to the information administrator, so that the product delivery service provider requests the information administrator to notify the name and the address of the product receiver (the name address notification request step). More specifically, the terminal 4 of the product delivery service provider transmits the mail describing the temporary identification code of the product receiver received from the terminal 3 of the product supplier to the terminal 2 of the information administrator.

In the next step, the information administrator identifies the identification code of the product receiver from the database 7 according to the temporary identification code of the product receiver, and instructs the name and the address of the product receiver and the product to be purchased to the product delivery service provider, so that the product delivery service provider delivers the product to the product receiver (the delivery request step).

More specifically, the information administrator identifies the identification code of the product receiver using the database 7 according to the temporary identification code of the product receiver received with the terminal 2 of the information administrator from the terminal 4 of the product delivery service provider. Further, the information administrator identifies the name and the address of the product receiver. Then, the information administrator transmits a mail describing the name and the address of the product receiver and the product to be purchased from the terminal 2 of the information administrator to the terminal 4 of the product delivery service provider.

In the delivery request step, the information administrator simply instructs the name and the address of the product receiver to the product delivery service provider, and does not need to notify the identification code of the product receiver to the product delivery service provider.

In the next step, the product delivery service provider receives the product from the product supplier (the product receiving step), and the product delivery service provider delivers the product to the address of the product receiver (the product delivery step).

As explained above, in the electronic business transaction system in the third and fourth embodiments, the product purchaser can purchase the product without disclosing the name and the address to the product supplier. Accordingly, it is possible for the product purchaser to reduce a risk of leaking the personal information, and to use the electronic business transaction system without worry.

Further, the product supplier securely delivers the product to the product receiver from the product delivery service provider through the information administrator without knowing the name and the address of the product receiver. Accordingly, it is possible for the product supplier to use the electronic business transaction system without worry as well.

Further, the product supplier confirms only the identification code of the product purchaser and the identification code of the product receiver, and the product delivery service provider confirms only the name and the address of the product receiver. Only the information administrator holds the relationship between the identification code of the product receiver and the name and the address. Accordingly, it is possible reduce a risk of inadvertently leaking the relationship between the identification code of the product receiver and the name and the address from the product supplier or the product delivery service provider.

For the reasons described above, in the electronic business transaction system in the third and fourth embodiments, it is possible for the product purchaser, the product receiver, the product supplier, and the product delivery service provider to use the electronic business transaction system without worry. Accordingly, it is possible to improve convenience of the electronic business transaction system.

What is claimed is:

1. An electronic business transaction system provided for a product purchaser to purchase a product from a product supplier, and for a product delivery service provider to deliver the product to an address of a product receiver specified by the product purchaser, comprising:

a terminal of the product purchaser connected to an electronic communication network;

a terminal of the product supplier connected to the electronic communication network;

a terminal of the product delivery service provider connected to the electronic communication network; and a terminal of an information administrator connected to the electronic communication network;

wherein said terminal of the information administrator is arranged to add an identification code specific to the product purchaser and an identification code specific to the product receiver to individual information data including a name and an address of the product purchaser and a name and an address of the product receiver to generate data, and to accumulate the data to construct a database therein, said terminal of the product purchaser is arranged to instruct the identification code and the product to be purchased to the terminal of the product supplier without disclosing the name and the address of the product purchaser and the name and the address of the product receiver, said terminal of the product supplier is arranged to instruct the identification code of the product receiver to the terminal of the information administrator so that the product supplier requests the information administrator to notify a temporary identification code relative to the product receiver when the product purchaser requests purchase of the product, said terminal of the information administrator is arranged to generate the temporary identification code relative to the product receiver, to accumulate the temporary identification code in the database, and to notify the temporary identification code to the terminal of the product supplier, said terminal of the product supplier is arranged to notify the temporary identification code of the product receiver to the terminal of the product delivery service provider, said terminal of the product delivery service provider is arranged to instruct the temporary identification code of the product receiver to the terminal of the information administrator so that the product deliver service provider requests the information administrator to notify the name and the address of the product receiver, said terminal of the information administrator is arranged to identify the identification code of the product receiver using the database according to the temporary identification code of the product receiver, and said terminal of the information administrator is arranged to instruct the name and the address of the product receiver and the product to be purchased to the product delivery service provider without disclosing the identification code of the product receiver so that the information administrator requests the product delivery service provider to deliver the product to the product receiver.

2. The electronic business transaction system according to claim 1, wherein said terminal of the product supplier is arranged to instruct the identification code of the product receiver and the product to be purchased to the terminal of the information administrator so that the product supplier requests the information administrator to notify the product delivery service provider when the product purchaser request purchase of the product.

3. An electronic business transaction system provided for a product purchaser to purchase a product from a product supplier, and for a product delivery service provider to deliver the product to an address of the product purchaser, comprising:
    a terminal of the product purchaser connected to an electronic communication network;
    a terminal of the product supplier connected to the electronic communication network;
    a terminal of the product delivery service provider connected to the electronic communication network; and
    a terminal of an information administrator connected to the electronic communication network;
    wherein said terminal of the information administrator is arranged to add an identification code specific to the product purchaser to individual information data including a name and an address of the product purchaser to generate data, and to accumulate the data to construct a database therein,
    said terminal of the product purchaser is arranged to instruct the identification code and the product to be purchased to the terminal of the product supplier without disclosing the name and the address of the product purchaser,
    said terminal of the product supplier is arranged to instruct the identification code of the product purchaser to the terminal of the information administrator so that the product supplier requests the information administrator to notify a temporary identification code relative to the product purchaser when the product purchaser request purchase of the product,
    said terminal of the information administrator is arranged to generate the temporary identification code relative to the product purchaser, to accumulate the temporary identification code in the database, and to notify the temporary identification code to the terminal of the product supplier,
    said terminal of the product supplier is arranged to notify the temporary identification code of the product purchaser to the terminal of the product delivery service provider,
    said terminal of the product delivery service provider is arranged to instruct the temporary identification code of the product purchaser to the terminal of the information administrator so that the product delivery service provider requests the information administrator to notify the name and the address of the product purchaser,
    said terminal of the information administrator is arranged to identify the temporary identification code of the product purchaser from the database according to the temporary identification code of the product purchaser,
    said terminal of the information administrator is arranged to identify the identification code of the product purchaser using the database according to the temporary identification code of the product purchaser, and
    said terminal of the information administrator is arranged to instruct the name and the address of the product purchaser and the product to be purchased to the product delivery service provider without disclosing the identification code of the product purchaser so that the information administrator requests the product delivery service provider to deliver the product to the product purchaser.

4. The electronic business transaction system according to claim 3, wherein said terminal of the product supplier is arranged to instruct the identification code of the product purchaser and the product to be purchased to the terminal of the information administrator so that the product supplier requests the information administrator to notify the product delivery service provider when the product purchaser request purchase of the product.

* * * * *